June 15, 1954

J. W. BRASWELL 2,681,147

WATER SOFTENING APPARATUS

Filed Dec. 8, 1951

INVENTOR.
JOHN W. BRASWELL
BY
John H. Cassidy
ATTORNEY

Patented June 15, 1954

2,681,147

UNITED STATES PATENT OFFICE 2,681,147

WATER SOFTENING APPARATUS

John W. Braswell, Bonne Terre, Mo.

Application December 8, 1951, Serial No. 260,693

5 Claims. (Cl. 210—24)

This invention pertains to a system for softening water as applied to a water supply system in order to provide a continuous supply of soft water. More particularly it pertains to means for inserting a softener tank into such a system in such a manner that when the softening agent therein has been exhausted the tank may be removed and replaced by a fresh one without interrupting the operation of the system as a whole, and with a minimum interruption of the soft water supply.

Briefly stated, the apparatus includes a softener tank adapted to contain a suitable softening agent, and arranged to insure a proper flow of the water therethrough. A pair of matching fittings is provided, one on said tank and one on the water piping system. Said fittings are detachably secured together to connect the tank into the system. The pipe fitting of this pair is equipped with a valve which, when set in one position, directs the flow of water from the supply system, through the tank to be acted upon by the softening agent, and then back to the system. When this valve is set in another position it shuts off the tank and establishes a by-pass for the water to flow in the system without passing through the tank. With the valve in the latter position the tank fitting may be disconnected from the pipe fitting and the tank removed from the system to be replaced by a fresh one. The spent tank may then be regenerated. A reversible closure is provided to seal the tank when not connected to the system, the opposite sides of said closure being colored differently to distinguish a spent tank from a fresh one.

A preferred embodiment of this invention is illustrated in the accompanying drawing, in which—

Figure 1:
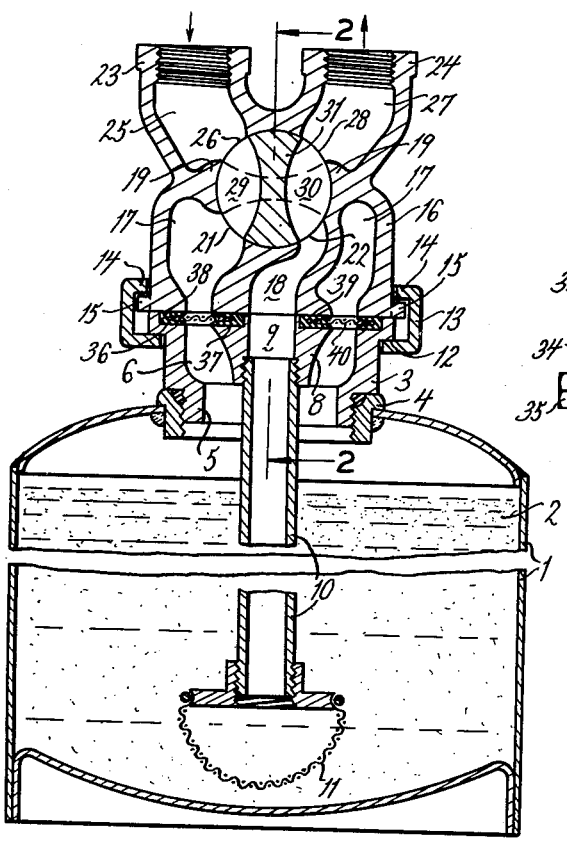
Fig. 1 is a sectional view on line 1—1, of Fig. 2, with part broken away, of a softener tank equipped with a pair of fittings in accordance with this invention.

Referring to the drawing, 1 designates a softener tank adapted to contain a water-softening agent 2, such as zeolite. A tank fitting 3 is mounted in the top of the tank 1. In the arrangement illustrated an internally threaded collar 4 is secured in a suitable opening in the top of the tank as by welding or otherwise, and a lower stem 5 on the fitting 3 is screwed into this collar.

The fitting 3 has its body portion hollowed to form an annular passage 6 extending vertically through the fitting. Supported within said hollow body on a pair of radial webs 7 is a partition member 8 having a central passage 9 extending therethrough. Attached to the member 8 is a pipe or tube 10 extending downward in the tank 1 and fitted at its lower end with a hemispherical screen 11 near the bottom of the tank. This screen and the lower portion of the tube 10 are buried in the charge of softening agent 2 in the tank. In this arrangement the annular passage 6 forms the inlet passage for hard water which flows downward through the softening material 2 after which it enters through the screen 11 and flows upward through the soft-water tube 10 and out at the outlet passage 9.

Fitted to bear against a shoulder 12 on the fitting 3 is a cam nut 13 having spaced cam sections 14 extending inward from the rim thereof adapted for engagement with similar cam sections 15 on a complementary fitting 16. This provides a detachable connection between the fittings 3 and 16.

The fitting 16 is formed with an annular passage 17 matching the passage 6 in the tank fitting 3 when said fittings are connected, and with a passage 18 similarly matching the passage 9. Above these passages is a partition 19 formed with a tapered bore to receive a valve 20. The passage 17 communicates with said bore by a port 21, and the passage 18 communicates with the same by a port 22. The upper part of the fitting 16 is formed with laterally adjacent elements 23 and 24, each provided with means, such as threads, for making pipe connections thereto. The element 23 is formed with a passage 25 communicating by a port 26 with the bore containing the valve 20, and the element 24 has a passage 27 communicating with said bore by a port 28. The valve 20 is formed with side passages 29 and 30, separated by a partition portion 31. It may be seen from Fig. 1 that with the valve positioned with the partition 31 vertical, as shown in full lines in that figure, the port 26 is connected with the port 21 by the side passage 29 of the valve, while the port 22 is connected with the port 28 by the passage 30. Thus an inlet for hard water is opened via the passages 25, 29, 17 and 6, and an outlet for soft water via the passages 9, 18, 30 and 27. The element 23 is, therefore, connected to the hard water supply and the element 24 to the soft water service system.

When the material 2 in the tank has become exhausted, a fresh tank may be substituted in a simple manner. The valve 20 is turned through 90° so that the partition 31 takes the horizontal position shown in dotted lines in Fig. 1. In this position one of the side passages of the valve connects the ports 21 and 22, so that the tank is shut off, while the other side passage forms a by-pass from passage 25 to passage 27 so water may continue to flow to the system connected to the element 24. The spent tank may now be removed by loosening the nut 13, and a fresh tank connected in its place. After the fresh tank has been connected the valve is returned to its full-line position, Fig. 1, and the soft-water service is immediately resumed.

Figure 2:
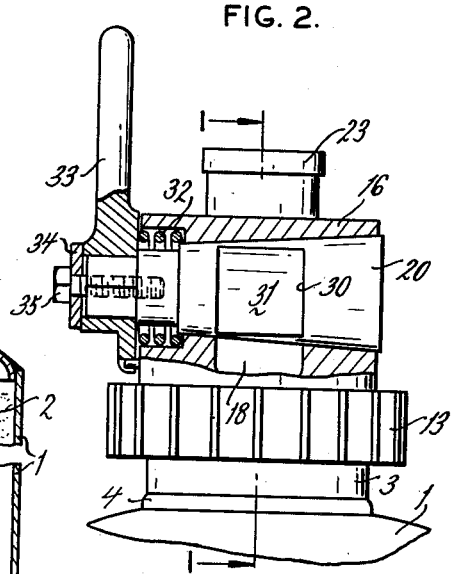
Fig. 2 is a partial section on line 2—2, of Fig. 1.
Figure 3:
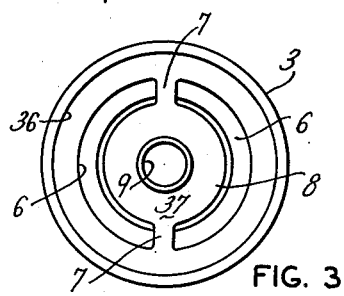
Fig. 3 is a plan view of the tank fitting.

As shown in Fig. 2, the valve 20 is retained in its seat in the fitting 16 by a spring 32 bearing against a handle 33 secured on the valve by a washer 34 and a stud 35.

At the junction between the fittings 3 and 16 recesses 36 and 37 are formed in the face of one of them to receive a gasket assembly comprising an outer gasket 38 seated in the recess 36 and an inner gasket 39 seated in the recess 37. These gaskets are joined by an annular screen member 40, extending across the inlet passage to keep out foreign matter. The inner edge of the outer gasket and the outer edge of the inner gasket are formed with V-shaped grooves as shown, to receive the edges of the screen member 40, and also to admit the fluid pressure active in the inlet passage so as to force these gaskets into sealing contact. The screen member 40 is seated at its inner and outer edges in these grooves, and thus serves to join the two gaskets in assembled relation so that the whole assembly may be inserted and removed as a unit.

Figure 5:
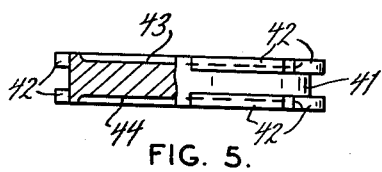
Fig. 5 is a side view, partly in section, of the seal for a separated tank.
Figure 4:
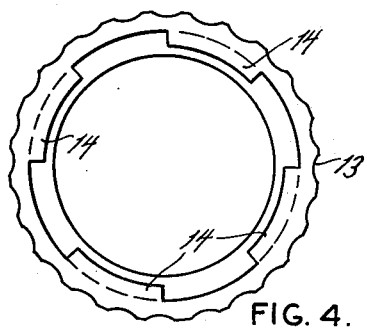
Fig. 4 is a plan view of a cam nut connecting the fitting.

When the tank 1 has been disconnected by separating the fittings 3 and 16, it may be sealed by a cap 41 shown in Fig. 5. This cap is provided with cam sections 42, similar to the section 15 on the fitting 16, and engageable by the sections 14 of the cam nut to secure the cap to the tank. The two opposite faces 43 and 44 of the cap may be colored with different colors, to indicate the condition of the tank when sealed. For example, the face 43 might be colored red, and the face 44 green. Then when a spent tank is disconnected from the system it might be sealed by aplying the cap with the red side out, the red color thus indicating a spent tank. When the tank has been regenerated, the cap is applied with the green side out, to indicate a fresh tank. The colors thus provide indicia to show the condition of the tank.

Figure 6:
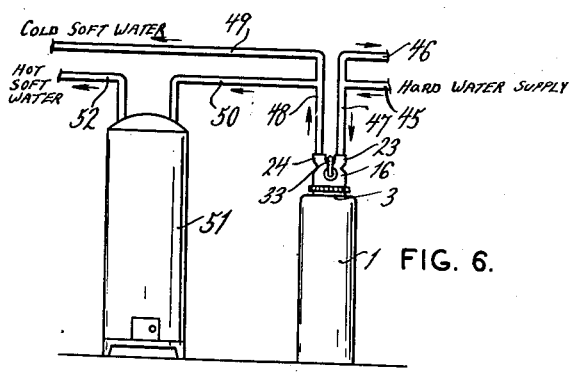
Fig. 6 is a diagrammatic view of a water supply system illustrating an application of this invention.

Fig. 6 shows one way in which the softener tank may be connected into a water-supply system. The main water supply line 45 may have a branch 46 leading to points where soft water is not needed, and a branch 47 to the tank 1. An outlet pipe 48 from the tank has a branch 49 supplying cold soft water, and a branch 50 leading to a heater 51 whose outlet pipe 52 supplies hot soft water to the system. The pipes 47 and 48 are preferably installed in a vertical position, and are connected respectively to the elements 23 and 24 of the fitting 16. When the tank has been connected to the fitting 16, a continuous supply of soft water is furnished to the system. When the material in the tank has become exhausted the valve 20 is turned to its "off" position (shown in dotted lines in Fig. 1) and the tank is disconnected and replaced with a fresh one. This operation need take only a few moments, and there is practically no interruption of the service.

It will be seen, therefore, that this invention provides an apparatus by which soft water may be supplied to a household or other system so as to give practically continuous service. A service may be operated whereby fresh or regenerated tanks may be supplied at proper intervals to replace those spent. The replacement is accomplished in a simple manner, without interrupting the water supply, and is such that it may be done by inexpert help. Since the inlet and outlet passages are concentric at the point of connection, the tank cannot be connected to the system wrong so as to reverse the direction of flow therethrough.

Various changes may be made in the details of construction, within the scope of the appended claims, without departing from the spirit of this invention. Parts of the invention may be used without the whole, and improvements may be added while retaining some or all of the advantages of the invention.

I claim:

1. In a household water-softening system having a water-softening tank and adapted for servicing by removal of a spent tank and replacement thereof by a fresh one, the improvement comprising, a combined inlet-and-outlet fitting on said tank having an inlet passage therethrough and partition means forming an outlet passage within said inlet passage, a soft-water tube in said tank connected with said outlet passage, a complementary pipe fitting attachable to said tank fitting and having inlet and outlet passages positioned to register respectively with said inlet and outlet passages of said tank fitting for passage of water through each, a valve in said pipe fitting movable to one position in which each of said passages is opened from its outer terminus to said tank and to another position in which both of said passages are closed and a by-pass is established from one of said termini to the other, and a detachable connection between said fittings.

2. In a household water-softening system having a water-softening tank and adapted for servicing by removal of a spent tank and replacement thereof by a fresh one, the improvement comprising, a combined inlet-and-outlet fitting on said tank having a centrally located outlet passage and an annular inlet passage extending around said outlet passage, a complementary pipe fitting attachable to said tank fitting having annular and central passages therein matching said inlet and outlet passages respectively, said passages in said pipe fitting having their outer termini in laterally adjacent elements adapted for connection to a piping system, and a detachable connection between said fittings.

3. A set of fittings for a water-softening system comprising, a tank fitting having means for attachment thereof to a softener tank and formed with inlet and outlet passages therethrough, said passages being arranged in concentric relation with one extending around the other, a complementary pipe fitting arranged for detachable connection to said tank fitting having inlet and outlet passages therethrough matching respectively those of said tank fitting for communication therewith and having outer termini adapted for connection to a piping system, said pipe fitting having a valve constructed so that in one position thereof both said passages are open for flow of water in each through both said fittings and in another position to form a by-pass from one of said termini to the other without entering said tank fitting, and a detachable connection between said fittings.

4. A set of fittings for a water-softening system comprising, a tank fitting having means for attachment thereof to a softener tank and formed with inlet and outlet passages therethrough, said passages being arranged in concentric relation with one extending around the other, a complementary pipe fitting arranged for detachable connection to said tank fitting having inlet and outlet passages therethrough matching respectively those of said tank fittings for communication therewith and having outer termini adapted for connection to a piping system, said pipe fitting having a valve constructed so that in one position thereof both said passages are open for flow of water in each through both said fittings and in another position to form a by-pass from one of said termini to the other without entering said tank fitting, a gasket member fitted around each of said passages at the junction of said fittings, a screen extending between said gasket members across the outer of said passages, and a detachable connection between said fittings.

5. A set of fittings for a water-softening system comprising, a tank fitting having means for attachment thereof to a softener tank, a complementary pipe fitting arranged for detachable connection to said tank fitting, said fittings having matching inlet and outlet passages therethrough, one of said passages being located within the other, a gasket adapted to seal each of said passages at the junction of said fittings, a screen extending across the outer of said passages and connected at its edges to both said gaskets to join the same in a unitary assembly, and a detachable connection between said fittings.

References Cited in the file of this patent

UNITED STATES PATENTS

| Number | Name | Date |
|---|---|---|
| 715,266 | Heston | Dec. 9, 1902 |
| 1,781,314 | Brandt | Nov. 11, 1930 |
| 1,937,324 | Pick | Nov. 28, 1933 |
| 1,938,628 | Huppertz | Dec. 12, 1933 |
| 2,252,065 | Culligan | Aug. 12, 1941 |
| 2,545,425 | Fischer | Mar. 13, 1951 |
| 2,572,082 | Welsh | Oct. 23, 1951 |
| 2,589,136 | Ralston | Mar. 11, 1952 |

FOREIGN PATENTS

| Number | Country | Date |
|---|---|---|
| 438,359 | Great Britain | Nov. 11, 1935 |
| 775,525 | France | Dec. 31, 1934 |